United States Patent
Singh et al.

(10) Patent No.: US 10,380,765 B2
(45) Date of Patent: Aug. 13, 2019

(54) VEHICLE VISION SYSTEM WITH CAMERA CALIBRATION

(71) Applicant: MAGNA ELECTRONICS INC., Auburn Hills, MI (US)

(72) Inventors: Jagmal Singh, Aschaffenburg (DE); Sebastian Pliefke, Sailauf (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 57 days.

(21) Appl. No.: 15/677,452

(22) Filed: Aug. 15, 2017

(65) Prior Publication Data

US 2018/0053322 A1 Feb. 22, 2018

Related U.S. Application Data

(60) Provisional application No. 62/375,919, filed on Aug. 17, 2016.

(51) Int. Cl.
| | |
|---|---|
| *B60R 1/00* | (2006.01) |
| *B60R 1/12* | (2006.01) |
| *G06T 7/73* | (2017.01) |
| *G06T 7/80* | (2017.01) |

(52) U.S. Cl.
CPC ............... *G06T 7/80* (2017.01); *B60R 1/00* (2013.01); *G06T 7/73* (2017.01); *B60R 1/12* (2013.01); *B60R 2001/1253* (2013.01); *B60R 2300/105* (2013.01); *B60R 2300/303* (2013.01); *B60R 2300/8093* (2013.01); *G06T 2207/30244* (2013.01); *G06T 2207/30252* (2013.01)

(58) Field of Classification Search
CPC ..... B60R 1/00; B60R 1/12; B60R 2001/1253; B60R 2300/105; B60R 2300/8093; G06T 7/80; G06T 7/73; G06T 2207/30244; G06T 2207/30252
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,421,865 | B2 | 4/2013 | Euler et al. |
| 9,150,155 | B2 | 10/2015 | Vico et al. |
| 9,205,776 | B2 | 12/2015 | Turk |
| 9,357,208 | B2 | 5/2016 | Gupta et al. |
| 9,491,450 | B2 | 11/2016 | Kussel |
| 9,491,451 | B2 | 11/2016 | Pliefke |

(Continued)

*Primary Examiner* — Huy T Nguyen
(74) *Attorney, Agent, or Firm* — Honigman LLP

(57) ABSTRACT

A camera calibration system for a vehicle includes a plurality of cameras disposed at a vehicle and having respective fields of view exterior of the vehicle. An image processor is operable to process image data captured by the cameras. The image processor is operable, via processing of image data captured by the cameras, to determine a change in orientation of at least one of the cameras. The image processor determines the change in orientation from a previous orientation during a previous ignition cycle of the vehicle and a current orientation at the onset of a current or subsequent ignition cycle of the vehicle.

20 Claims, 2 Drawing Sheets

(56) References Cited

U.S. PATENT DOCUMENTS

| | | |
|---|---|---|
| 9,563,951 B2 | 2/2017 | Okouneva |
| 9,688,200 B2 | 6/2017 | Knudsen |
| 9,723,272 B2 | 8/2017 | Lu et al. |
| 9,762,880 B2 | 9/2017 | Pflug |
| 9,834,153 B2 | 12/2017 | Gupta et al. |
| 2011/0216201 A1* | 9/2011 | McAndrew ............... G06T 7/80 348/148 |
| 2014/0169627 A1 | 6/2014 | Gupta |
| 2014/0247352 A1 | 9/2014 | Rathi et al. |
| 2014/0333729 A1 | 11/2014 | Pflug |
| 2014/0350834 A1 | 11/2014 | Turk |
| 2015/0002670 A1 | 1/2015 | Bajpai |
| 2015/0049193 A1 | 2/2015 | Gupta et al. |
| 2015/0175072 A1 | 6/2015 | Sabeti |
| 2015/0178576 A1 | 6/2015 | Gupta |
| 2015/0291215 A1 | 10/2015 | Bajpai et al. |
| 2015/0332446 A1* | 11/2015 | Wang ...................... B60R 11/04 348/37 |
| 2016/0180182 A1 | 6/2016 | Gupta et al. |
| 2016/0210750 A1 | 7/2016 | Singh et al. |
| 2016/0335510 A1 | 11/2016 | Gupta et al. |
| 2017/0278270 A1 | 9/2017 | Singh et al. |
| 2018/0174327 A1 | 6/2018 | Singh |
| 2018/0281698 A1 | 10/2018 | Tang et al. |
| 2018/0299533 A1 | 10/2018 | Pliefke et al. |

\* cited by examiner

VEHICLE VISION SYSTEM WITH CAMERA CALIBRATION

CROSS REFERENCE TO RELATED APPLICATION

The present application claims the filing benefits of U.S. provisional application Ser. No. 62/375,919, filed Aug. 17, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a camera calibration system that determines a change in orientation of cameras (such as due to loading or unloading of the vehicle) without requiring movement of the vehicle. The system stores images captured at the end of an ignition cycle of the vehicle (such as when the vehicle is stopped and before the ignition is turned off), and, when the vehicle is again started, the system compares newly captured images with the stored captured images to determine if there has been a change in the camera orientation. If a change is determined (such as due to loading or unloading of the vehicle while the ignition was off), the system calibrates the cameras and/or system accordingly, such that displayed images (such as images derived from image data captured by the vehicle cameras and stitched or merged to provide a surround view display) are aligned and adjusted to accommodate the determined offset.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may display video images, such as a rearview display or a top down or bird's eye or surround view display (SVS) or the like.

Figure 1:
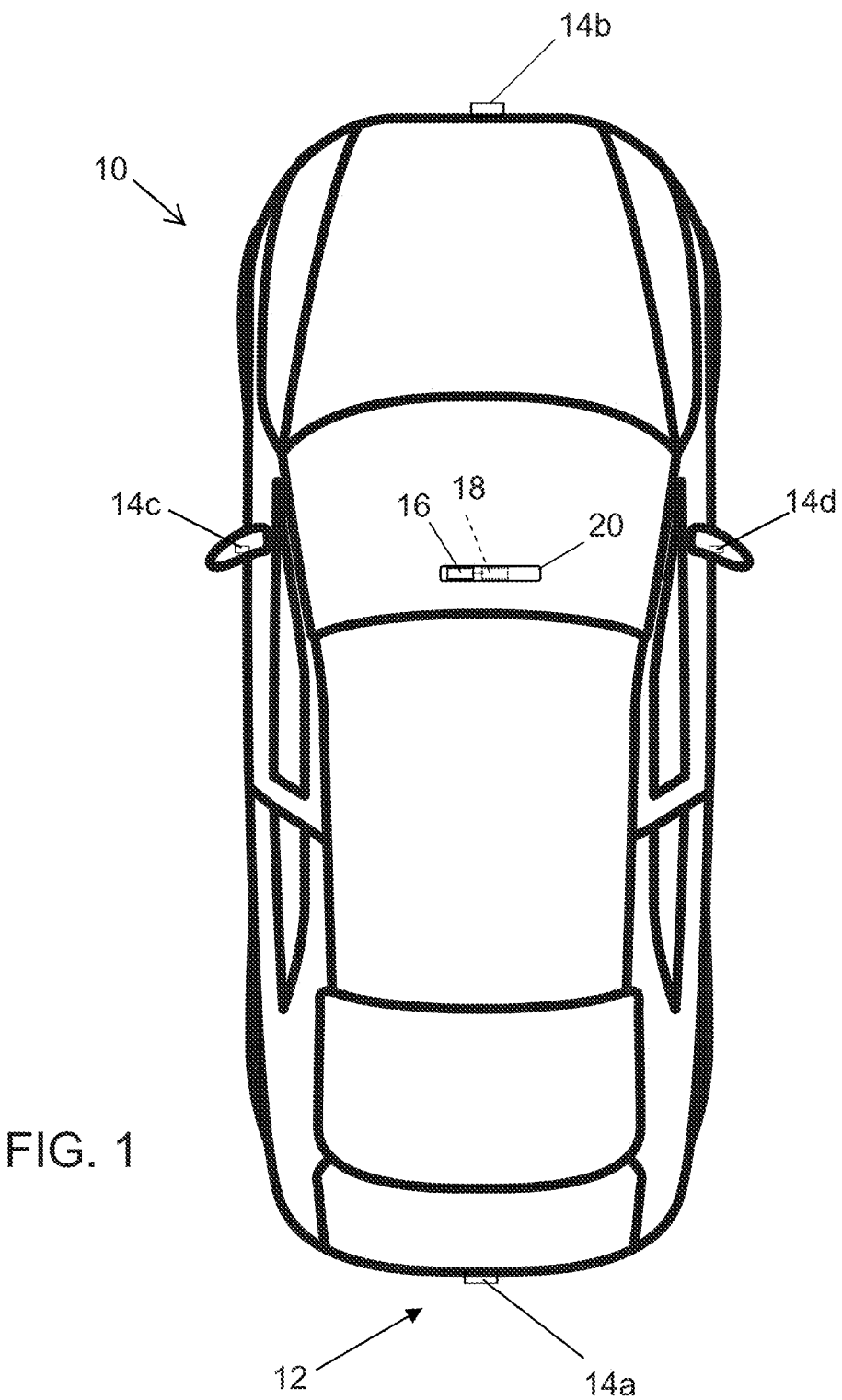
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Extrinsic camera calibration is necessary for providing a proper SVS top view image stitched out of four cameras. Long term calibration takes care of camera alignment relative to the vehicle. For covering situations where the vehicle pitch, yaw, roll orientation or vehicle height changes, such as due to additional luggage, occupants or load brought into or removed from the vehicle, past the last duty cycle, a specific short term extrinsic calibration should come into use. Another use case is to detect a camera misalignment due to a not fully closed trunk door or lid (such as for a rear camera mounted at the not fully closed door or lid).

The method of the present invention triggers and executes a short term extrinsic calibration to store feature points of a structure from motion (SFM) detection of the last frame of a duty cycle. By comparing these feature points with points detected after waking up the camera system again (such as when the vehicle is again started after it had been shut off) enables the system to detect offsets in the according camera images and to calibrate the system based on these offsets. The calibration may be temporary or short term, in that, when the vehicle is loaded, the system may adapt for the loaded orientation, and then when the vehicle is later unloaded, the system may again adapt the calibration (or return to its initial calibration) for the unloaded orientation. The calibration may adjust the processing of image data captured by the camera(s) to account for the determined change, such that the image data, when stitched with image data captured by the multiple cameras, provides a displayed composite image that is generally or substantially seamless.

In a surround view system, cameras are mounted on front, rear, left and right side of the vehicle, and images from all four (or more) cameras are stitched to generate a top-view/bowl-view/3D view. Extrinsic camera calibration is carried out generally at the vehicle manufacturing plant, or as long term calibration to take care of extrinsic changes due to normal usage, mechanical shocks, thermal changes and/or the like. Even for the calibrated camera (calibrated relative to the vehicle), there is a need for short term calibration, such as, for example, if vehicle loading changes suddenly (resulting in a change in pitch or yaw or roll of the vehicle and its cameras relative to the ground). Such short term calibration can be achieved by a really high performance long term calibration algorithm, which calibrates the camera on a short drive immediately after the vehicle moves after loading changes.

The short term calibration method of the present invention does not require such motion after vehicle loading. The method uses structure from motion (SfM) for short term calibration. When the vehicle is slowing down, a 3D point cloud of the surroundings is generated using SfM in the field of view of all of the vehicle cameras. For feature detection, the system detects counters in the scene for tracking. Once the vehicle stops, the systems captures and stores the last frame of image data, with 3D information of the object in that frame (from 3D point cloud due to previous motion).

When the vehicle is loaded (or unloaded), the orientation (e.g., pitch, yaw, roll) of the camera may change relative to the ground and horizon. For example, due to vehicle loading, camera angles and z-position may change (changes in x and y position will be minimal). After the vehicle is loaded/unloaded, and the system is activated (such as when the vehicle is started again after such loading/unloading), the system captures again the first frame of image data. The features in this first frame on new start or current ignition cycle are matched with the stored last frame from previous ignition cycle. Even if something changes in the scene, such as another vehicle is parked behind the equipped vehicle and in the field of view of the camera, due to the larger field of view of the camera (that encompasses regions beyond where the parked vehicle is located), there will still be several features that can be matched in two frames. Having already the 3D information available for the features, camera calibration can then be performed as a mathematical problem.

One way to verify the correctness is to build a logic, such as, for example, when the front and rear cameras give the same offset, but with different signs, this means that there is a case of vehicle loading (where, for example, the rear of the vehicle may lower to tilt the vehicle so that the rear camera views more downward and the front camera views more upward as compared to the pre-loading views). Another scenario could be that the trunk door was not closed correctly leading to a pitch offset, and this can be detected by short term calibration of all four cameras.

Figure 2:
FIG. 2 is a camera image of a scene captured without loading of the vehicle, showing 3D information of detected points that are known due to previous motion.
Figure 3:
FIG. 3 is a camera image of a scene captured after loading of the vehicle, showing features that are detected and matched with the last frame from previous ignition cycle.

For example, comparing FIG. 2 (unloaded vehicle) with FIG. 3 (loaded vehicle), it is noticeable that the field of view of the rear camera is more downward in FIG. 3 (loaded vehicle) than the field of view of the rear camera in FIG. 2 (unloaded vehicle). The system processes the captured image data frames (where the image of FIG. 2 may have been captured when the vehicle was stopped and at or near the end of a first ignition cycle of the vehicle, and the image of FIG. 3 may have been captured at the start of a second or subsequent ignition cycle) to track the change in position of the various features or points in the image data frames to determine such a shift in the field of view of the camera. This determination is done before any movement of the vehicle at the onset of the second or subsequent or current ignition cycle.

The subsequent or current ignition cycle is the next time the ignition of the vehicle is cycled and may be at any time following the previous ignition cycle. For example, the previous ignition cycle may end when the vehicle is parked (whereby the system captures a frame of image data and stores the frame of image data). Later, such as several seconds later or several days later, when the vehicle ignition is next cycled, the system again captures a frame of image data and compares that captured frame of image data (captured in the current or subsequent ignition cycle) to the frame of image data captured at the end of the previous ignition cycle.

Thus, the present invention provides a short term calibration system that stores images captured at the end of an ignition cycle of the vehicle (such as when the vehicle is stopped and before the ignition is turned off). When the vehicle is again started, the system compares newly captured images with the stored captured images to determine if there has been a change in the camera orientation. If a change is determined (such as due to loading of the vehicle or unloading of the vehicle while the ignition was off), the system determines the offset or misalignment and may calibrate the cameras and/or system accordingly, such that displayed images (derived from image data captured by the vehicle cameras and stitched or merged to provide a surround view display) are aligned and adjusted to accommodate the determined offset.

The system may utilize aspects of the vision systems and calibration systems described in U.S. Pat. Nos. 9,723,272; 9,688,200; 9,563,951; 9,491,451; 9,491,450; 9,357,208; 9,205,776; 9,150,155; 8,421,865; 7,720,580 and/or 7,038,577, and/or U.S. Publication Nos. U.S.-2014-0333729; U.S.-2014-0247352; U.S.-2014-0169627; U.S.-2016-0180182; U.S.-2015-0002670; U.S.-2015-0049193; U.S.-2015-0291215; U.S.-2015-0178576; U.S.-2015-0175072; U.S.-2016-0210750 and/or U.S.-2016-0335510, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. U.S.-2014-0340510; U.S.-2014-0313339; U.S.-2014-0347486; U.S.-2014-0320658; U.S.-2014-0336876; U.S.-2014-0307095; U.S.-2014-0327774; U.S.-2014-0327772; U.S.-2014-0320636; U.S.-2014-0293057; U.S.-2014-0309884; U.S.-2014-0226012; U.S.-2014-0293042; U.S.-2014-0218535; U.S.-2014-0218535; U.S.-2014-0247354; U.S.-2014-0247355; U.S.-2014-0247352; U.S.-2014-0232869; U.S.-2014-0211009; U.S.-2014-0160276; U.S.-2014-0168437; U.S.-2014-0168415; U.S.-2014-0160291; U.S.-2014-0152825; U.S.-2014-0139676; U.S.-2014-0138140; U.S.-2014-0104426; U.S.-2014-0098229; U.S.-2014-0085472; U.S.-2014-0067206; U.S.-2014-0049646; U.S.-2014-0052340; U.S.-2014-0025240; U.S.-2014-0028852; U.S.-2014-005907; U.S.-2013-0314503; U.S.-2013-0298866; U.S.-2013-0222593; U.S.-2013-0300869; U.S.-2013-0278769; U.S.-2013-0258077; U.S.-2013-0258077; U.S.-2013-0242099; U.S.-2013-0215271; U.S.-2013-0141578 and/or U.S.-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. U.S.-2012-0162427; U.S.-2006-0050018 and/or U.S.-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. U.S.-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera calibration system for a vehicle, said camera calibration system comprising:
   at least one camera disposed at a vehicle and having a field of view exterior of the vehicle;
   an image processor operable to process frames of image data captured by said at least one camera;
   wherein, during a second ignition cycle of the vehicle that is subsequent to a first ignition cycle of the vehicle, said camera calibration system compares a frame of image data captured by said at least one camera during the first ignition cycle to a frame of image data captured by said at least one camera at the onset of the second ignition cycle;
   wherein said camera calibration system, via comparison of the frames of image data captured by said at least one camera, determines a change in orientation of said at least one camera from a previous orientation during the first ignition cycle of the vehicle to a current orientation at the onset of the second ignition cycle of the vehicle.

2. The camera calibration system of claim 1, wherein said camera calibration system stores the frame of image data captured by said at least one camera at or near an end of the first ignition cycle of the vehicle, and wherein, at the onset of the second ignition cycle of the vehicle, said camera calibration compares the frame of image data captured by said at least one camera at the onset of the second ignition cycle to the stored frame of captured image data to determine a change in orientation of said at least one camera.

3. The camera calibration system of claim 2, wherein said camera calibration system compares detected features of the frame of image data captured by said at least one camera during the second ignition cycle to detected features of the stored frame of captured image data to determine the change in orientation of said at least one camera.

4. The camera calibration system of claim 2, wherein said camera calibration system stores the frame of image data captured by said at least one camera when the vehicle is stationary at or near the end of the first ignition cycle of the vehicle.

5. The camera calibration system of claim 2, wherein said camera calibration system stores the frame of image data captured by said at least one camera when the vehicle is stationary at or near the start of the second ignition cycle of the vehicle.

6. The camera calibration system of claim 1, wherein said camera calibration system determines a change in orientation of said at least one camera that is indicative of loading or unloading of the vehicle between the first and second ignition cycles.

7. The camera calibration system of claim 1, comprising a display operable to display video images derived from image data captured by said at least one camera.

8. The camera calibration system of claim 7, wherein, responsive to determination of a change in orientation of said at least one camera, said camera calibration system adjusts processing of captured image data to accommodate the determined change in orientation.

9. The camera calibration system of claim 1, wherein said at least one camera comprises a rear camera disposed at a rear portion of the vehicle and having a field of view rearward of the vehicle.

10. The camera calibration system of claim 1, wherein said at least one camera comprises a plurality of cameras disposed at the vehicle and having respective fields of view exterior of the vehicle.

11. A camera calibration system for a vehicle, said camera calibration system comprising:
at least one camera disposed at a vehicle and having a field of view exterior of the vehicle;
an image processor operable to process image data captured by said at least one camera;
wherein said image processor is operable, via processing of image data captured by said at least one camera, to determine a change in orientation of said at least one camera;
wherein said camera calibration system stores image data captured by said at least one camera when the vehicle is stationary at or near the end of a previous ignition cycle of the vehicle;
wherein said at least one camera captures image data when the vehicle is stationary at an onset of a current ignition cycle of the vehicle that is subsequent to the previous ignition cycle; and
wherein said camera calibration system compares detected features of the image data captured by said at least one camera at the onset of the current ignition cycle to detected features of the stored image data captured by said at least one camera at or near the end of the previous ignition cycle to determine the change in orientation of said at least one camera.

12. The camera calibration system of claim 11, wherein said camera calibration system determines a change in orientation of said at least one camera that is indicative of loading or unloading of the vehicle between the previous and current ignition cycles.

13. The camera calibration system of claim 11, comprising a display operable to display video images derived from image data captured by said at least one camera.

14. The camera calibration system of claim 13, wherein, responsive to determination of a change in orientation of said at least one camera, said camera calibration system adjusts processing of captured image data to accommodate the determined change in orientation.

15. The camera calibration system of claim 11, wherein said at least one camera comprises a rear camera disposed at a rear portion of the vehicle and having a field of view rearward of the vehicle.

16. The camera calibration system of claim 11, wherein said at least one camera comprises a plurality of cameras disposed at the vehicle and having respective fields of view exterior of the vehicle.

17. A camera calibration system for a vehicle, said camera calibration system comprising:
at least one camera disposed at a vehicle and having a field of view exterior of the vehicle;
an image processor operable to process frames of image data captured by said at least one camera;
a display operable to display video images derived from image data captured by said at least one camera;
wherein, during a second ignition cycle of the vehicle that is subsequent to a first ignition cycle of the vehicle, said camera calibration system compares a first frame of image data captured by said at least one camera during the first ignition cycle to a second frame of image data captured by said at least one camera at the onset of the second ignition cycle;
wherein said camera calibration system, via comparison of the frame of image data captured by said at least one camera during the first ignition cycle to the frame of image data captured by said at least one camera at the onset of the second ignition cycle, determines a change in orientation of said at least one camera from a previous orientation during the first ignition cycle of the vehicle to a current orientation at the onset of the second ignition cycle of the vehicle;
wherein said camera calibration system determines a change in orientation of said at least one camera that is indicative of loading or unloading of the vehicle between the previous and current ignition cycles; and
wherein, responsive to determination of a change in orientation of said at least one camera, said camera calibration system adjusts processing of captured image data to accommodate the determined change in orientation.

18. The camera calibration system of claim 17, wherein said camera calibration stores at least one frame of image data captured by said at least one camera at or near an end of the first ignition cycle of the vehicle, and wherein, at the onset of the second ignition cycle of the vehicle, said camera calibration system compares the frame of image data captured by said at least one camera during the second ignition cycle to the stored at least one frame of captured image data to determine the change in orientation of said at least one camera, and wherein said camera calibration system compares detected features of the frame of image data captured by said at least one camera during the second ignition cycle to detected features of the stored at least one frame of captured image data to determine the change in orientation of said at least one camera.

19. The camera calibration system of claim 17, wherein said at least one camera comprises a rear camera disposed at a rear portion of the vehicle and having a field of view rearward of the vehicle.

20. The camera calibration system of claim 17, wherein said at least one camera comprises a plurality of cameras disposed at the vehicle and having respective fields of view exterior of the vehicle.

\* \* \* \* \*